United States Patent
Wang et al.

(10) Patent No.: US 10,819,766 B2
(45) Date of Patent: Oct. 27, 2020

(54) VOICE ENCODING AND SENDING METHOD AND APPARATUS

(71) Applicant: Tencent Technology (Shenzhen) Company Limited, Shenzhen (CN)

(72) Inventors: Xinliang Wang, Shenzhen (CN); Bin Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 284 days.

(21) Appl. No.: 15/985,356

(22) Filed: May 21, 2018

(65) Prior Publication Data

US 2018/0270288 A1     Sep. 20, 2018

Related U.S. Application Data

(63) Continuation-in-part of application No. PCT/CN2017/073542, filed on Feb. 15, 2017.

(30) Foreign Application Priority Data

Feb. 29, 2016    (CN) .......................... 2016 1 0115415

(51) Int. Cl.
*H04L 29/06*     (2006.01)
*H04L 12/26*     (2006.01)
(Continued)

(52) U.S. Cl.
CPC ............ *H04L 65/608* (2013.01); *G10L 19/22* (2013.01); *H04L 29/06* (2013.01); *H04L 47/14* (2013.01);
(Continued)

(58) Field of Classification Search
None
See application file for complete search history.

(56) References Cited

U.S. PATENT DOCUMENTS

| | | | | |
|---|---|---|---|---|
| 7,230,919 B2* | 6/2007 | Flanagan | .......... | H04L 29/06027 370/230 |
| 7,751,316 B2* | 7/2010 | Yarlagadda | ....... | H04L 29/06027 370/230 |
| 2002/0033880 A1* | 3/2002 | Sul | ......................... | H04N 7/152 348/14.09 |

FOREIGN PATENT DOCUMENTS

| CN | 101808244 A | 8/2010 |
|---|---|---|
| CN | 102231898 A | 11/2011 |

(Continued)

OTHER PUBLICATIONS

Tencent Technology, ISRWO, PCT/CN2017/073542, May 11, 2017, 9 pgs.

(Continued)

*Primary Examiner* — Robert M Morlan
(74) *Attorney, Agent, or Firm* — Morgan, Lewis & Bockius LLP

(57) ABSTRACT

This application relates to a voice encoding and sending method performed at a computer implemented system. The method includes sending voice data from at least one mobile terminal to at least one different mobile terminal; receiving at least one path of Real-Time Transport Control Protocol (RTCP) packet based on the voice data; parsing the at least one path of the RTCP packet, to obtain network status information; obtaining comprehensive network status information by means of statistics of the network status information; and adjusting a quality of service (QoS) parameter according to the comprehensive network status information, and encoding and sending the voice data according to the adjusted QoS parameter.

17 Claims, 5 Drawing Sheets

(51) Int. Cl.
*G10L 19/22* (2013.01)
*H04L 12/811* (2013.01)
*H04L 12/801* (2013.01)
*H04L 12/841* (2013.01)

(52) U.S. Cl.
CPC ............ *H04L 47/283* (2013.01); *H04L 47/38* (2013.01); *H04L 65/607* (2013.01); *H04L 65/80* (2013.01); *H04L 69/22* (2013.01); *H04L 43/087* (2013.01); *H04L 43/0829* (2013.01); *H04L 43/0894* (2013.01); *H04L 65/403* (2013.01)

(56) References Cited

FOREIGN PATENT DOCUMENTS

| | | |
|---|---|---|
| CN | 105610635 A | 5/2016 |
| WO | WO 2015076643 A1 | 5/2015 |

OTHER PUBLICATIONS

Tencent Technology, IPRP, PCT/CN2017/073542, Sep. 4, 2018, 8 pgs.

* cited by examiner

VOICE ENCODING AND SENDING METHOD AND APPARATUS

RELATED APPLICATIONS

This application is a continuation-in-part application of PCT/CN2017/073542, entitled "VOICE ENCODING AND SENDING METHOD AND APPARATUS" filed on Feb. 15, 2017, which claims priority to Chinese Patent Application No. 201610115415.2, filed with the State Intellectual Property Office of the People's Republic of China on Feb. 29, 2016, and entitled "VOICE ENCODING AND SENDING METHOD AND APPARATUS," all of which are incorporated herein by reference in their entirety.

FIELD OF THE TECHNOLOGY

This application relates to the field of voice communication technologies, and in particular, to a voice encoding and sending method and apparatus.

BACKGROUND OF THE DISCLOSURE

With development of the mobile Internet, a growing quantity of users require to use a voice on a terminal. A voice call on a terminal relates to a variety of technical fields, including a voice encoding and decoding technology, signal preprocessing, multi-channel audio mixing, multi-terminal capabilities exchange, anti-network jitter in a network, processing on a lost packet, cross-platform, and the like. Therefore, implementation of voice communication on a terminal is susceptible to a network status.

SUMMARY

Embodiments of this application provide a voice encoding and sending method and apparatus that can improve voice quality of voice communication.

According to a first aspect of the present disclosure, a method for encoding and sending voice is performed at a mobile terminal that is communicatively connected to a plurality of mobile terminals via a computer server: sending voice data to at least one of the plurality of mobile terminals; receiving at least one path of Real-Time Transport Control Protocol (RTCP) packet based on the voice data; parsing the at least one path of the RTCP packet, to obtain network status information; creating comprehensive network status information based on statistics of the network status information; adjusting a quality of service (QoS) parameter according to the comprehensive network status information, and encoding and sending the voice data according to the adjusted QoS parameter.

According to another aspect of the present disclosure, a mobile terminal is communicatively connected to a plurality of mobile terminals via a computer server, the mobile terminal including one or more processors, memory coupled to the one or more processors, and a plurality of executable instructions stored in the memory, wherein the executable instructions, when executed by the one or more processors, cause the mobile terminal to perform the aforementioned method.

According to a third aspect of the present disclosure, a non-transitory computer readable storage medium storing a plurality of executable instructions configured for execution by one or more processors of a mobile terminal that is communicatively connected to a plurality of mobile terminals via a computer server, wherein the plurality of instructions, when executed by the one or more processors, cause the mobile terminal to perform the aforementioned method.

DESCRIPTION OF EMBODIMENTS

To make the objectives, technical solutions, and advantages of this application clearer and more comprehensible, the following further describes this application in detail with reference to the accompanying drawings and embodiments. It should be understood that the exemplary embodiments described herein are merely used to explain this application but are not intended to limit this application.

Figure 1:
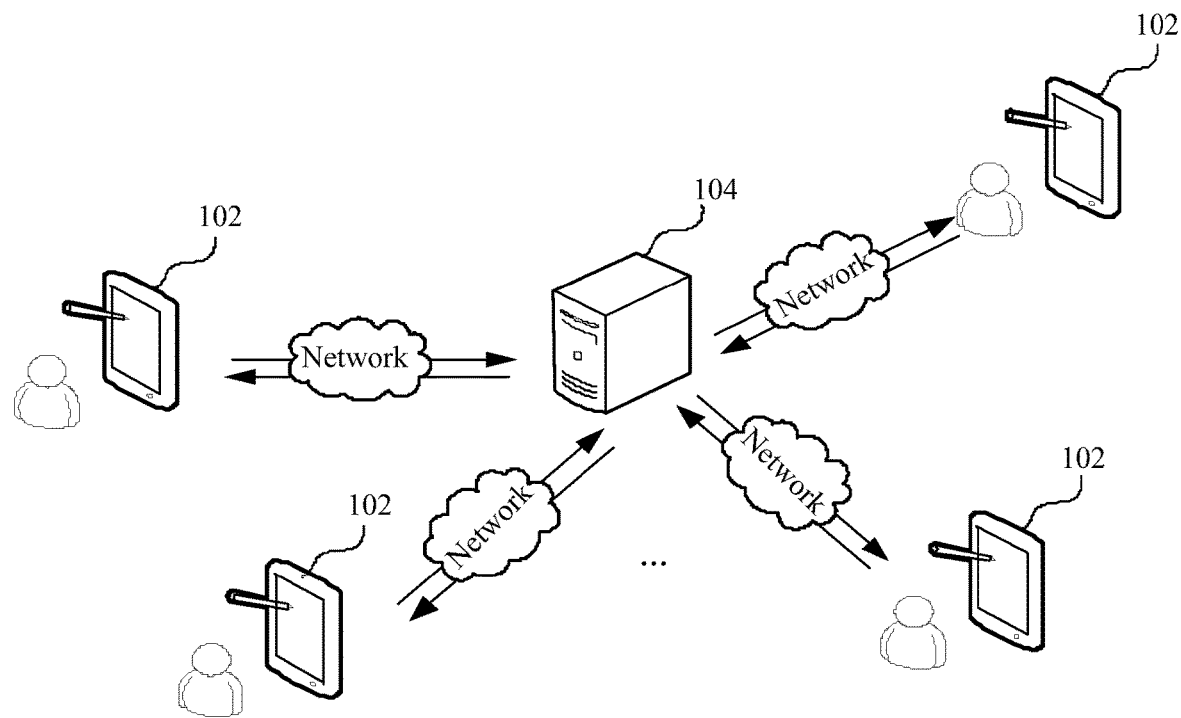
FIG. 1 is a diagram of an application environment of a voice encoding and sending method according to an exemplary embodiment.

FIG. 1 is a diagram of an application environment of a voice encoding and sending method according to an exemplary embodiment. The voice encoding and sending method provided in this exemplary embodiment of this application may be applied to a system shown in FIG. 1. Referring to FIG. 1, multiple terminals 102 communicate with a server 104 by using a network, and these terminals 102 can implement a multi-party voice conversation. A terminal 102 may be used as a voice sender to collect a user voice, encode the voice, and then send the voice to other multiple terminals as voice receivers. The terminal 102 may also be used as a voice receiver to receive a voice sent by another terminal as a voice sender. In this exemplary embodiment of this application, these terminals 102 include, but are not limited to, various personal computers, personal digital assistants, notebook computers, tablet computers, smart phones, wearable intelligent devices, and the like that can run a voice client to implement a multi-party voice conversation.

Figure 2:
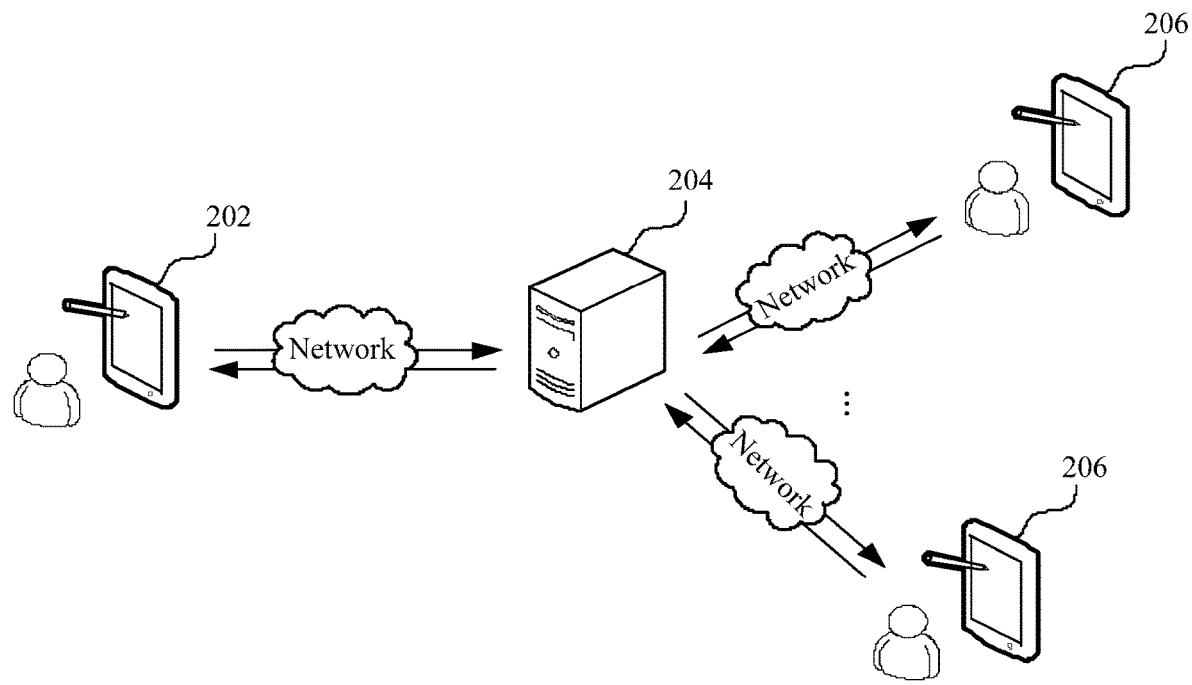
FIG. 2 is a diagram of an application scenario of a voice encoding and sending method according to an exemplary embodiment.

FIG. 2 is a diagram of an application scenario of a voice encoding and sending method according to an exemplary embodiment. In a specific application scenario, as shown in FIG. 2, a terminal 202 is a sender, and communicates with a server 204 by using a network; a terminal 206 is a receiver, and communicates with the server 204 by using a network. The terminal 202 collects a user voice, encodes the user voice, and then sends a voice data stream to at least one terminal 206 by using the server 204. The at least one terminal 206 receives the voice data stream, obtains at least one RTCP packet by means of a statistical analysis, and returns the at least one RTCP packet to the terminal 202. The terminal 202 receives the at least one RTCP packet, parses the at least one RTCP packet to obtain network status information, obtains comprehensive network status information by means of statistics collection according to the network status information, adjusts a QoS parameter according to the comprehensive network status information, and further encodes and sends a voice by using the adjusted QoS parameter. It should be noted that, in another embodiment, systems in FIG. 1 and FIG. 2 may not include a server, and voice data of terminals is not converted by a server; instead, the voice data is directly transmitted between the terminals.

It may be understood that, in addition to being applied to the application scenarios shown in FIG. 1 and FIG. 2, the voice encoding and sending method provided in this exemplary embodiment of this application may be further applied to a two-party voice communication scenario, that is, there may be one terminal 206 in FIG. 2. In the application scenario, the terminal 202 as a sender receives one path of RTCP packet, further parses the received RTCP packet, to obtain network status information, obtains comprehensive network status information by means of statistics collection according to the network status information, adaptively adjusts a QoS parameter according to the comprehensive network status information, and encodes and sends a voice according to the adjusted QoS parameter.

Figure 3:
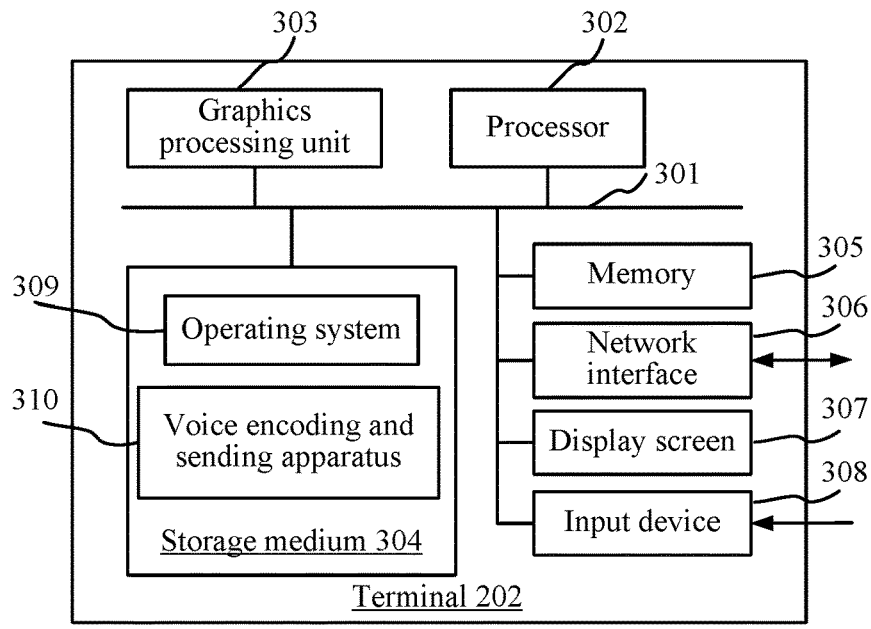
FIG. 3 is a diagram of the internal structure of a terminal 202 in FIG. 2.

FIG. 3 is a diagram of the internal structure of a terminal 202 in FIG. 2. As shown in FIG. 3, an exemplary embodiment provides a terminal 202. The terminal 202 includes a processor 302, a graphics processing unit 303, a storage medium 304, a memory 305, a network interface 306, a display screen 307, and an input device 308 that are connected by using a system bus 301. The storage medium 304 stores an operating system 309 and a voice encoding and sending apparatus 310. The voice encoding and sending apparatus 310 is configured to perform the voice encoding and sending method. The processor 302 is configured to provide calculation and control capabilities, to support running of an entire portable electronic device. The graphics processing unit 303 in the terminal 202 is configured to at least provide a capability of drawing an application operation interface, for example, drawing a voice collection interface.

The memory 305 is configured to provide an environment for running of the voice encoding and sending apparatus in the storage medium. In general, the memory 305 corresponds to a non-transitory computer readable storage medium including volatile and non-volatile media, and removable and non-removable media implemented by using any method or technology used for storing information such as a computer readable instruction, a data structure, a program module or other data. The computer readable storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices.

The network interface 306 is configured to: perform network communication with a server, and receive or send data, for example, send a voice data stream to the server or receive a voice data stream from the server, or send, to the server, an RTCP packet returned to a receiver. The display screen 307 is configured to display icons and interfaces of various applications, for example, display a voice call interface. The input device 308 is configured to input various data, messages, and instructions, for example, input a call confirmation instruction or a dialing instruction.

Figure 4:
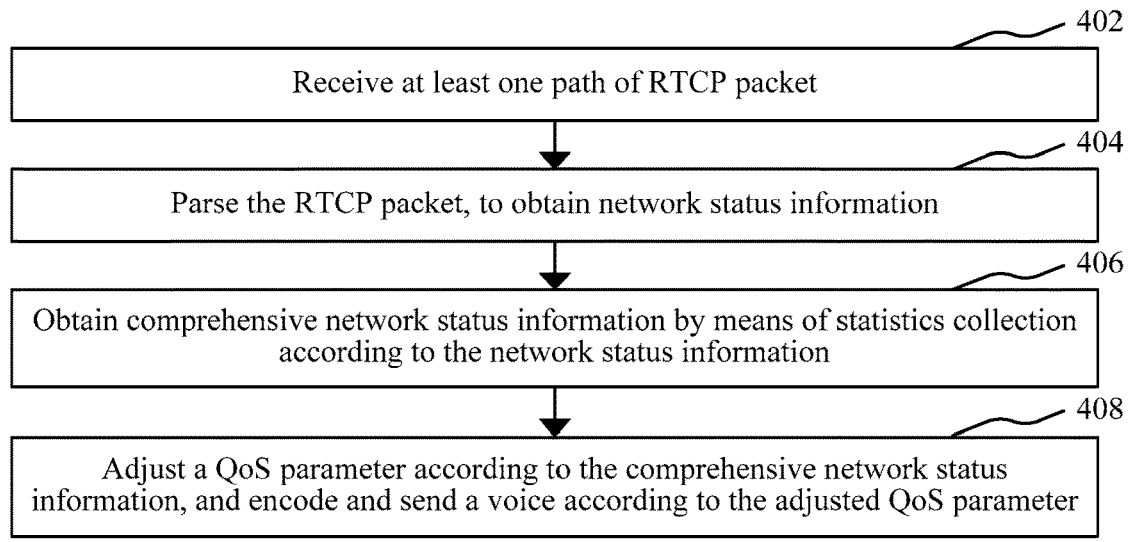
FIG. 4 is a flowchart of a voice encoding and sending method according to an exemplary embodiment.

FIG. 4 is a flowchart of a voice encoding and sending method according to an exemplary embodiment. The voice encoding and sending method is described by using an example in which the voice encoding and sending method is applied to a terminal in FIG. 1 to FIG. 3, and is specifically applied to a terminal as a sender. The method includes the following steps:

Step 402: Receive at least one path of RTCP packet.

The RTCP is a standard protocol used to return receiving quality of a network in multimedia real-time communication. In the RTCP, a receiver collects statistics on information in a period of time, such as received packets in a network, a network delay, and a network jitter, and returns the information to a sender by using an RTCP packet. After receiving the RTCP packet, the sender obtains network status information of the receiver by means of parsing, including information such as a packet loss rate in the network, the network delay, and the network jitter. The sender adjusts, according to the network status information, a data packet encoding and sending policy, including a packet sending policy, a coding rate, a redundancy packet policy, and the like.

In this exemplary embodiment of this application, in a scenario of a multi-party voice conversation, a terminal as a receiver receives a voice data stream from at least one other participant, analyzes each voice data stream in real time, collects statistics on a packet reception status, obtains network status information by means of calculation, including a packet loss rate, a network delay, a network jitter, and the like, uses the information as a basis for determining receiving quality, and encapsulates the information in an RTCP packet according to the RTCP, and returns the RTCP packet to a terminal as a sender. The terminal as the sender receives the RTCP packet returned by the terminal as the receiver. If there are multiple participants, the terminal receives multiple paths of RTCP packets. If there is one participant, the terminal receives one path of RTCP packet.

Step 404: Parse the RTCP packet, to obtain network status information.

Specifically, after receiving the RTCP packet returned by the receiver, the terminal as the sender parses the RTCP packet according to the RTCP, to obtain at least one path of network status information that is returned. The network status information includes information such as a packet loss rate, a network delay, a network jitter, a quantity of received bytes, and a network time stamp.

Step 406: Obtain comprehensive network status information by means of statistics collection according to the network status information.

In this exemplary embodiment of this application, because the terminal obtains at least one path of network status information by means of parsing, the terminal needs to obtain the comprehensive network status information by means of statistics collection according to the network status information. Specifically, the terminal may store all network status information that is returned in a latest preset time, and for each type of network status information, may obtain corresponding comprehensive network status information by means of statistics collection. According to this exemplary embodiment of this application, a comprehensive packet loss rate, a comprehensive network delay, and a comprehensive network jitter may be separately calculated.

Step 408: Adjust a QoS parameter according to the comprehensive network status information, and encode and send a voice according to the adjusted QoS parameter.

QoS is a capability that a network can use various basic technologies to provide a better service for specified network communication, is a security mechanism of the network, and is a technology used to resolve problems such as a network delay and congestion. In a scenario of a multi-party voice conversation, each participant receives voice data sent by another participant. The voice data may be forwarded by a server or not forwarded by a server. A QoS policy is generally a corresponding policy proactively made to reduce a negative impact of an unstable network on a service when network transmission quality changes. In multimedia communication, to ensure audio and video quality, generally, QoS needs to be used to ensure multimedia quality.

In this exemplary embodiment of this application, the packet sending policy, the redundancy packet policy, and the encoding policy need to be adjusted according to network quality returned by the receiver. The QoS parameter that needs to be adjusted includes a group length of a data packet, a redundancy packet quantity for each group of data packets, a coding rate, a multiplex frame quantity, and the like. The terminal may send and encode the voice according to the adjusted QoS parameter. In this way, the QoS parameter can adapt to a current comprehensive network status, thereby better resolving the problems such as a network delay and congestion, and improving voice quality of a multi-party conversation.

In an exemplary embodiment, the step of obtaining comprehensive network status information by means of statistics collection according to the network status information includes: obtaining network status information received in a latest preset time; and obtaining the comprehensive network status information by means of statistics collection according to the obtained network status information in the latest preset time.

Further, in an exemplary embodiment, the step of obtaining the comprehensive network status information by means of statistics collection according to the obtained network status information in the latest preset time includes: for each type of network status information, calculating the counted number of times of distribution of each piece of network status information, to obtain a distribution range of all statistics values, and obtaining, by means of calculation according to the range, comprehensive network status information corresponding to the type of network status information, where a ratio of the counted number of times of distribution of the comprehensive network status information in the range to a sum of all counted numbers of times in the entire range is a preset value, and the preset value is less than 1.

Figure 5:
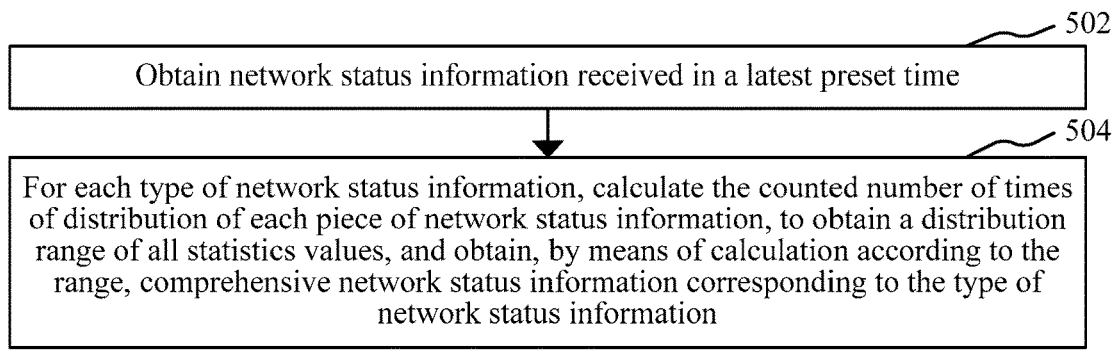
FIG. 5 is a flowchart of obtaining comprehensive network status information by means of statistics collection according to an exemplary embodiment.

FIG. 5 is a flowchart of obtaining comprehensive network status information by means of statistics collection according to an exemplary embodiment. Specifically, as shown in FIG. 5, the step of obtaining comprehensive network status information by means of statistics collection according to the network status information includes:

Step 502: Obtain network status information received in a latest preset time.

In this exemplary embodiment of this application, the terminal receives the at least one path of RTCP packet, and parses each received RTCP packet, to obtain the network status information. The terminal may store the network status information in the latest preset time that is obtained by parsing. The preset time may be, for example, 30 s.

Step 504: For each type of network status information, calculate the counted number of times of distribution of each piece of network status information, to obtain a distribution range of all statistics values, and obtain, by means of calculation according to the range, comprehensive network status information corresponding to the type of network status information.

The network status information includes a packet loss rate, a network delay, a network jitter, a quantity of received bytes, a network time stamp, and the like. In this exemplary embodiment of this application, the packet loss rate, the network delay, and the network jitter are used in calculation. For each type of network status information, the counted number of times of distribution of each piece of network status information is calculated, to obtain the distribution range of all the statistics values, and further, the comprehensive network status information corresponding to the type of network status information is obtained by means of calculation according to the range. A ratio of the counted number of times of distribution of the comprehensive network status information in the range to a sum of all counted numbers of times in the entire range is a preset value, and the preset value is less than 1.

The packet loss rate is used as an example for description. The terminal stores all packet loss rates that are returned in the latest preset time. For all the packet loss rates in the preset time, the counted number of times of distribution of each packet loss rate is calculated, a distribution range of all statistics values is, for example, a range [Lost_1, Lost_h], and a packet loss rate, for example, a packet loss rate Lost_m is found in all the packet loss rates, to make a ratio of the counted number of times of distribution of the packet loss rate Lost_m in the range [Lost_1, Lost_h] to a sum of all counted numbers of times in the entire range be a preset value, where the preset value is less than 1, for example, is 0.85 to 0.95. Alternatively, the preset value may be 0.9. Similarly, for the network delay and the network jitter, corresponding comprehensive network status information may also be obtained by means of statistics collection by using the algorithm, to finally obtain a comprehensive packet loss rate, a comprehensive network delay, and a comprehensive network jitter. The comprehensive packet loss rate, the comprehensive network delay, and the comprehensive network jitter represent a comprehensive network status of receiving a data packet by another terminal.

In an exemplary embodiment, the comprehensive network status information includes at least one of a packet loss rate, a network delay, or a network jitter. The method of how to adjust the QoS parameter according to different comprehensive network status information is described in detail below.

Figure 6:
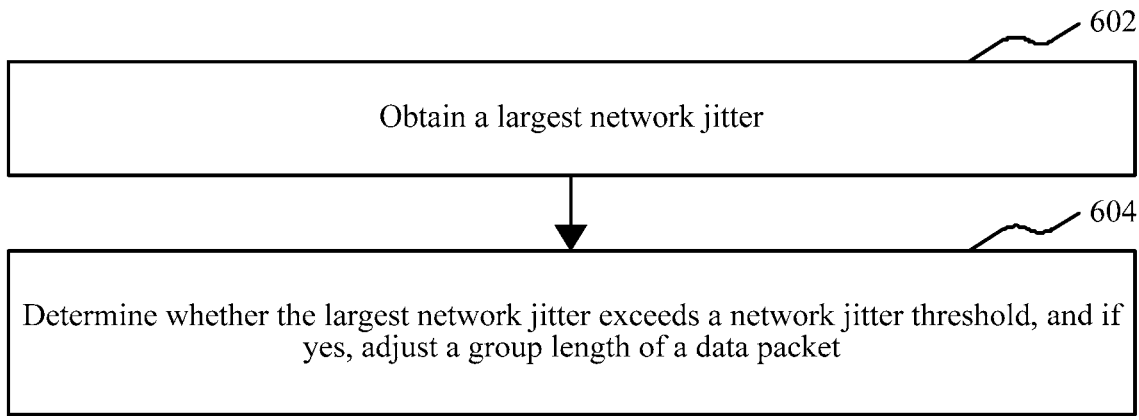
FIG. 6 is a flowchart of adjusting a group length according to an exemplary embodiment.

FIG. 6 is a flowchart of adjusting a group length according to an exemplary embodiment. As shown in FIG. 6, in an exemplary embodiment, the step of adjusting a QoS parameter according to the comprehensive network status information includes:

Step 602: Obtain a largest network jitter.

In this exemplary embodiment of this application, because the network jitter obtained by means of calculation is a comprehensive network jitter in the latest preset time, the largest network jitter in multiple comprehensive network jitters obtained by means of statistics collection may be obtained. The largest network jitter can reflect a poorest network status. Therefore, when the largest network jitter is used in calculation, a better result can be obtained.

Step 604: Determine whether the largest network jitter exceeds a network jitter threshold, and if yes, adjust a group length of a data packet.

The network jitter threshold is a preset threshold. When the largest network jitter exceeds the network jitter threshold, it indicates that network transmission is unstable, a jitter is large, and a corresponding QoS parameter needs to be adjusted.

In this exemplary embodiment of this application, if the largest network jitter exceeds the network jitter threshold, the group length of a data packet needs to be adjusted. The group length is a quantity of sent data packets in each group. Herein, the data packet does not include a redundancy packet. In an exemplary embodiment, the group length is three to five data packets. A larger group length indicates that a larger network delay may be introduced, and the network delay affects real-time performance. In this exemplary embodiment of this application, calculation is performed according to 20 ms per frame, the largest network delay that may be introduced is 60 ms or 80 ms, and the group length may be controlled to three to five data packets. In this way, the introduced largest network delay does not exceed 100 ms, thereby ensuring real-time performance of data. Specifically, if the largest network jitter exceeds the network jitter threshold, the group length of a data packet may be adjusted to four data packets; otherwise, the group length of a data packet may be three data packets.

Figure 7:
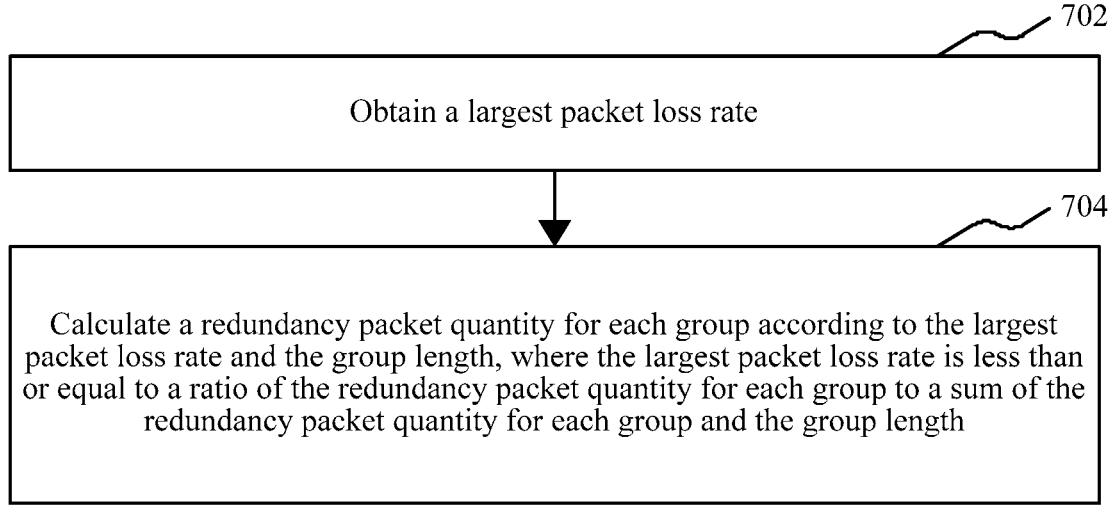
FIG. 7 is a flowchart of adjusting a redundancy packet quantity according to an exemplary embodiment.

FIG. 7 is a flowchart of adjusting a redundancy packet quantity according to an exemplary embodiment. As shown in FIG. 7, in an exemplary embodiment, the step of adjusting a QoS parameter according to the comprehensive network status information includes:

Step 702: Obtain a largest packet loss rate.

In this exemplary embodiment of this application, because the packet loss rate obtained by means of calculation is a comprehensive packet loss rate in the latest preset time, the largest packet loss rate in multiple comprehensive packet loss rates obtained by means of statistics collection may be obtained. The largest packet loss rate can reflect a poorest network status. Therefore, when the largest packet loss rate is used in calculation, a better result can be obtained.

Step 704: Calculate a redundancy packet quantity for each group according to the largest packet loss rate and the group length, where the largest packet loss rate is less than or equal to a ratio of the redundancy packet quantity for each group to a sum of the redundancy packet quantity for each group and the group length.

In this exemplary embodiment of this application, the redundancy packet quantity for each group may be calculated according to the largest packet loss rate and the group length, where the largest packet loss rate is less than or equal to the ratio of the redundancy packet quantity for each group to the sum of the redundancy packet quantity for each group and the group length (herein, the group length is a quantity of data packets that are non-redundancy packets in each group of data packets), thereby ensuring that a lost packet in a network can be theoretically restored by using a data packet and a redundancy packet in each group.

In an exemplary embodiment, the redundancy packet quantity for each group may be calculated according to the following formula:

$$M>=(N+M)*\text{Max\_lost}$$

where M is the redundancy packet quantity, N is the group length, and Max_lost is the largest packet loss rate.

In this exemplary embodiment of this application, N data packets and M redundancy packets are sent in each group, that is, N+M packets are one group. A data packet can be completely restored provided that a quantity of lost packets in a group does not exceed M. Therefore, it is required that Max_lost<=M/(N+M). A lost packet may be restored only when the packet loss rate is less than a largest packet loss rate that can be tolerated.

Figure 8:
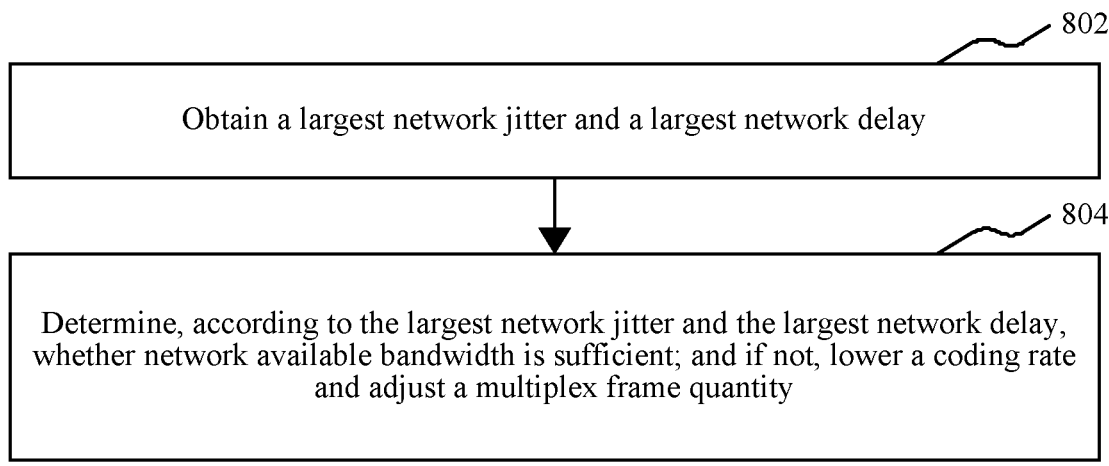
FIG. 8 is a flowchart of lowering a coding rate and a multiplex frame quantity according to an exemplary embodiment.

FIG. 8 is a flowchart of lowering a coding rate and a multiplex frame quantity according to an exemplary embodiment. As shown in FIG. 8, in an exemplary embodiment, the step of adjusting a QoS parameter according to the comprehensive network status information includes:

Step 802: Obtain a largest network jitter and a largest network delay.

In this exemplary embodiment of this application, because the network jitter and the network delay that are obtained by means of calculation are a comprehensive network jitter and a comprehensive network delay in the latest preset time, the largest network jitter and the largest network delay in multiple comprehensive network jitters and multiple network delays that are obtained by means of statistics collection may be obtained. The largest network jitter and the largest network delay can reflect a poorest network status. Therefore, when the largest network jitter and the largest network delay are used in calculation, a better result can be obtained.

Step 804: Determine, according to the largest network jitter and the largest network delay, whether network available bandwidth is sufficient; and if not, lower a coding rate and adjust a multiplex frame quantity.

In this exemplary embodiment of this application, a network jitter threshold and a network delay threshold may be preset. The network jitter threshold is a network jitter when transmit bandwidth exceeds largest network bandwidth, and the network delay threshold is a network delay when the transmit bandwidth exceeds the largest network bandwidth. When the largest network jitter is greater than the network jitter threshold, and the largest network delay is greater than the network delay threshold, it indicates that current network available bandwidth is insufficient. The coding rate and the multiplex frame quantity may be lowered to make the network available bandwidth be sufficient.

Figure 9:
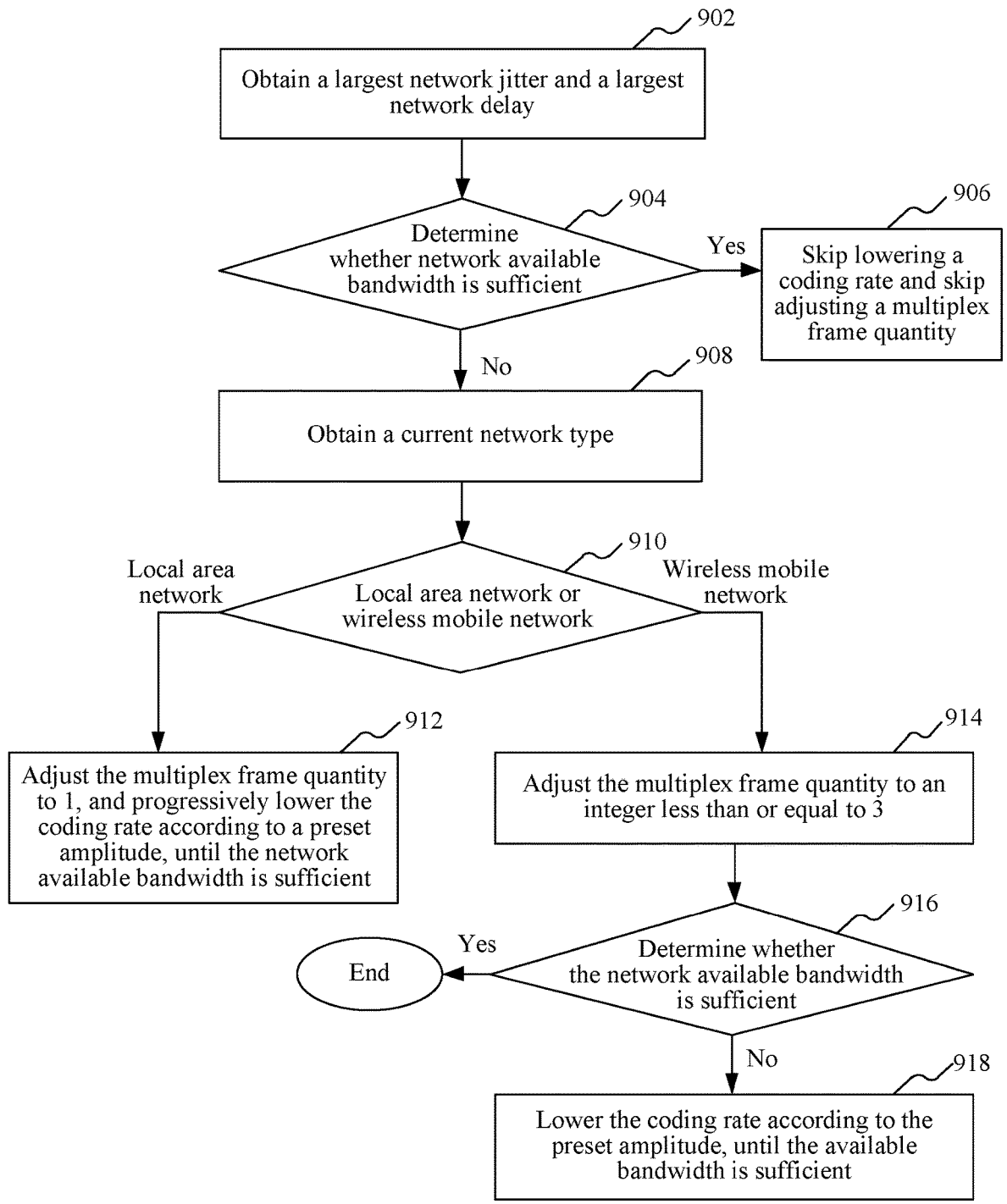
FIG. 9 is a flowchart of lowering a coding rate and a multiplex frame quantity according to another embodiment.

Further, FIG. 9 is a flowchart of lowering a coding rate and a multiplex frame quantity according to another embodiment. As shown in FIG. 9, a specific process of lowering the coding rate and the multiplex frame quantity according to the comprehensive network status information includes:

Step 902: Obtain a largest network jitter and a largest network delay.

Step 904: Determine, according to the largest network jitter and the largest network delay, whether network available bandwidth is sufficient; and if yes, perform step 906; otherwise, perform step 908.

In this exemplary embodiment of this application, a network jitter when transmit bandwidth exceeds largest network bandwidth is set as the network jitter threshold, and a network delay when the transmit bandwidth exceeds the largest network bandwidth is set as the network delay threshold. When the largest network jitter is greater than the network jitter threshold, and the largest network delay is greater than the network delay threshold, it indicates that current network available bandwidth is insufficient.

Step 906: Skip lowering the coding rate and skip adjusting the multiplex frame quantity.

If the current network available bandwidth is sufficient, the coding rate and the multiplex frame quantity do not need to be lowered.

Step 908: Obtain a current network type.

In this exemplary embodiment of this application, the network type includes a local area network and a wireless mobile network. The local area network includes a wired network and a wireless network, and may be a wireless local area network such as a Wi-Fi network. Policies for adjusting QoS parameters vary with different network types.

Step 910: Determine whether the current network type is a local area network or a wireless mobile network; and if the current network type is a local area network, perform step 912; or if the current network type is a wireless mobile network, perform step 914.

Step 912: Adjust the multiplex frame quantity to 1, and progressively lower the coding rate according to a preset amplitude, until the network available bandwidth is sufficient.

In this exemplary embodiment of this application, if the current network type is a local area network, for example, a current network is a Wi-Fi network, if network bandwidth in the Wi-Fi network is insufficient, only the coding rate needs to be lowered, and frame multiplexing is not performed, that is, the multiplex frame quantity is 1. The multiplex frame quantity is used to control a quantity of audio frames to be used as one network packet for sending, and a larger multiplex frame quantity indicates higher network bandwidth utilization. Further, the coding rate may be progressively lowered according to the preset amplitude, for example, a coefficient of the preset amplitude may be 0.1, until it is determined, according to the largest network jitter and the largest network delay that are returned, that the network available bandwidth is sufficient. An output bit rate of an encoder can be controlled in real time by means of the lowered coding rate, so that the network available bandwidth is gradually sufficient.

Step 914: Adjust the multiplex frame quantity to an integer less than or equal to 3.

In this exemplary embodiment of this application, if the current network type is not a Wi-Fi network, and for example, may be a wireless mobile network of 2G, 3G, 4G, or the like, frame multiplexing needs to be performed in priority. Specifically, the multiplex frame quantity may be an integer less than or equal to 3. According to this exemplary embodiment of this application, a multiplex frame quantity in a 2G mobile network may be adjusted to 3; a multiplex frame quantity in another mobile network may be adjusted to 2.

Step 916: Determine, according to the adjusted multiplex frame quantity, whether the network available bandwidth is sufficient; and if yes, end the procedure; otherwise, perform step 918.

Step 918: Lower the coding rate according to the preset amplitude, until the network available bandwidth is sufficient.

In this exemplary embodiment of this application, after frame multiplexing, if the network available bandwidth is still insufficient, the coding rate needs to be lowered. Specifically, the coding rate may be progressively lowered according to the preset amplitude, for example, a coefficient of the preset amplitude may be 0.1, until it is determined, according to the largest network jitter and the largest network delay that are returned, that the network available bandwidth is sufficient. An output bit rate of an encoder can be controlled in real time by means of the lowered coding rate, so that the network available bandwidth is gradually sufficient.

As described above, according to the adjusted QoS parameter, the output bit rate of the encoder can be controlled in real time by means of the coding rate, and the multiplex frame quantity can be used to control a quantity of audio frames to be used as one network packet for sending. A larger multiplex frame quantity indicates higher network bandwidth utilization. Bandwidth occupied by various packet headers can be lowered, and an impact of a packet loss increases, and a delay also increases. Further, it is determined, according to the group length N and the redundancy packet quantity M, whether a redundancy packet needs to be sent. If $M<=0$, a redundancy packet does not need to be sent; otherwise, for every N data packets, M redundancy packets are generated according to a redundancy packet quantity calculation method, and are sent.

According to this exemplary embodiment of this application, the QoS parameter is adjusted according to the network status returned by the receiver, and the voice is encoded and sent by using the adjusted QoS parameter. Such an adaptive adjustment method can improve voice quality.

Figure 10:
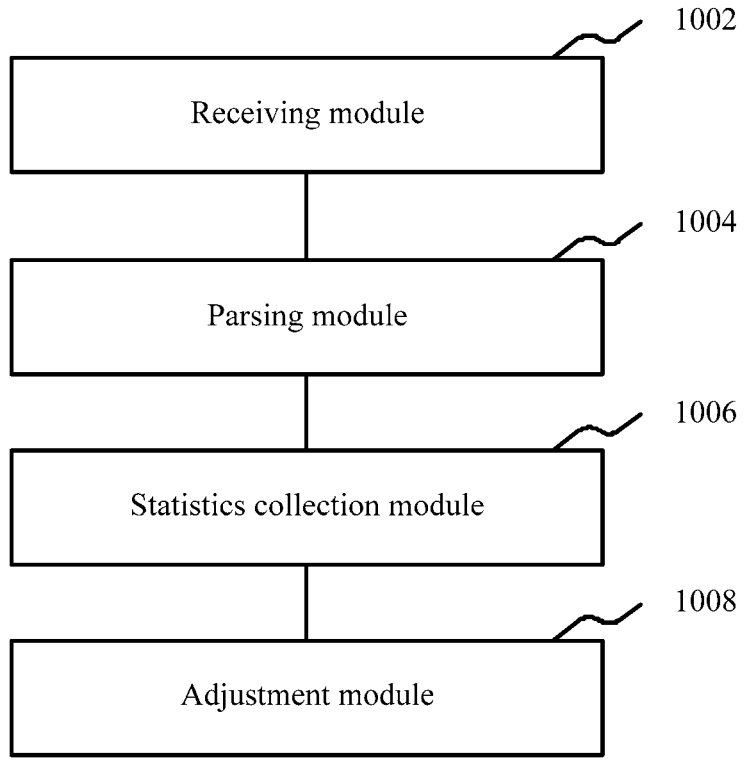
FIG. 10 is a structural block diagram of a voice encoding and sending apparatus according to an exemplary embodiment.

FIG. 10 is a structural block diagram of a voice encoding and sending apparatus according to an exemplary embodiment. As shown in FIG. 10, this exemplary embodiment provides the voice encoding and sending apparatus. The apparatus includes a receiving module 1002, a parsing module 1004, a statistics collection module 1006, and an adjustment module 1008.

The receiving module 1002 is configured to receive at least one path of RTCP packet.

The parsing module 1004 is configured to parse the RTCP packet, to obtain network status information.

The statistics collection module 1006 is configured to obtain comprehensive network status information by means of statistics collection according to the network status information.

The adjustment module 1008 is configured to: adjust a QoS parameter according to the comprehensive network status information, and encode and send a voice according to the adjusted QoS parameter.

In an exemplary embodiment, the comprehensive network status information includes at least one of a packet loss rate, a network delay, or a network jitter.

Figure 11:
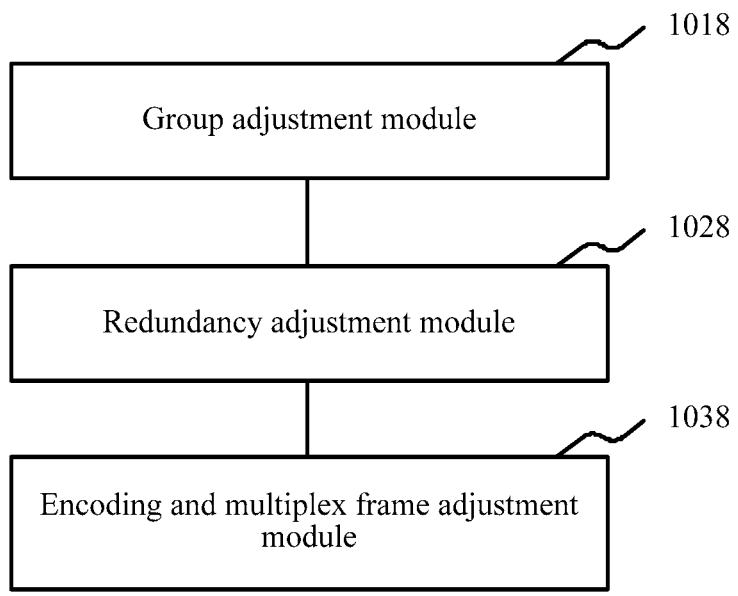
FIG. 11 is a structural block diagram of an adjustment module according to an exemplary embodiment.

FIG. 11 is a structural block diagram of an adjustment module according to an exemplary embodiment. In this exemplary embodiment, as shown in FIG. 11, the adjustment module 1008 includes a group adjustment module 1018, a redundancy adjustment module 1028, and an encoding and multiplex frame adjustment module 1038.

The group adjustment module 1018 is configured to: obtain a largest network jitter; and determine whether the largest network jitter exceeds a network jitter threshold, and if yes, adjust a group length of a data packet.

According to embodiment of this application, the group length is three to five data packets.

The redundancy adjustment module 1028 is configured to: obtain a largest packet loss rate; and calculate a redundancy packet quantity for each group according to the largest packet loss rate and the group length, where the largest packet loss rate is less than or equal to a ratio of the redundancy packet quantity for each group to a sum of the redundancy packet quantity for each group and the group length.

The encoding and multiplex frame adjustment module 1038 is configured to: obtain a largest network jitter and a largest network delay; and determine, according to the largest network jitter and the largest network delay, whether network available bandwidth is sufficient; and if not, lower a coding rate and adjust a multiplex frame quantity.

Further, the encoding and multiplex frame adjustment module 1038 is configured to: obtain a current network type; and if the current network type is a local area network, adjust the multiplex frame quantity to 1, and progressively lower the coding rate according to a preset amplitude, until the network available bandwidth is sufficient.

The encoding and multiplex frame adjustment module 1038 is further configured to: obtain a current network type; and if the current network type is a wireless mobile network, adjust the multiplex frame quantity to an integer less than or equal to 3, determine, according to the adjusted multiplex frame quantity, whether the network available bandwidth is sufficient, and if not, further progressively lower the coding rate according to a preset amplitude, until the network available bandwidth is sufficient.

It may be understood that, in another embodiment, the adjustment module 1008 may include at least one of the group adjustment module 1018, the redundancy adjustment module 1028, or the encoding and multiplex frame adjustment module 1038.

In an exemplary embodiment, the statistics collection module 1006 is configured to: obtain network status information received in a latest preset time; and obtain the comprehensive network status information by means of statistics collection according to the obtained network status information in the latest preset time. Specifically, in an exemplary embodiment, the statistics collection module 1006 is further configured to: for each type of network status information, calculate the counted number of times of distribution of each piece of network status information, to obtain a distribution range of all statistics values, and obtain, by means of calculation according to the range, comprehensive network status information corresponding to the type of network status information, where a ratio of the counted number of times of distribution of the comprehensive network status information in the range to a sum of all counted numbers of times in the entire range is a preset value, and the preset value is less than 1.

According to the embodiments of this application, the apparatus in FIG. 10 or FIG. 11 may include a memory and a processor. Various modules in the apparatus may be instruction modules that can be executed by the processor and are stored in the memory. The memory may include a high-speed random access memory (RAM), and may also include a non-volatile memory, for example, one or more magnetic storage apparatuses, flash memories, or other non-volatile solid-state memories.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may be: a magnetic disk, an optical disc, a read-only memory (ROM), a RAM, or the like.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A voice encoding and sending method performed at a mobile terminal that is communicatively connected to a plurality of mobile terminals via a computer server, the method comprising:
    sending voice data to at least one of the plurality of mobile terminals;
    receiving at least one path of Real-Time Transport Control Protocol (RTCP) packet based on the voice data;
    parsing the at least one path of the RTCP packet, to obtain network status information including network jitters;
    creating comprehensive network status information based on statistics of the network status information;
    adjusting a quality of service (QoS) parameter according to the comprehensive network status information by obtaining a largest one of the network jitters and adjusting a data packet group length in accordance with a determination that the largest network jitter exceeds a network jitter threshold; and
    encoding and sending the voice data according to the adjusted QoS parameter.

2. The method according to claim 1, wherein the comprehensive network status information comprises at least one of packet loss rates, and network delays.

3. The method according to claim 2, wherein the data packet group length is defined to be three to five data packets.

4. The method according to claim 2, wherein the adjusting of the QoS parameter comprises:
    obtaining a largest one of the packet loss rates; and
    calculating a redundancy packet quantity for each group according to the largest packet loss rates and the data packet group length, wherein the largest packet loss rates is less than or equal to a ratio of the redundancy packet quantity for each group to a sum of the redundancy packet quantity for each group and the data packet group length.

5. The method according to claim 2, wherein the adjusting of the QoS parameter comprises:
    obtaining a largest one of the network delays; and
    determining, according to the largest network delay, whether network available bandwidth is sufficient; and if not, lowering a coding rate and adjusting a multiplex frame quantity, wherein the multiplex frame quantity is used to control a quantity of audio frames to be used as one data packet for sending.

6. The method according to claim 5, wherein the determining, according to the largest network delay, whether the network available bandwidth is sufficient comprises:
    determining whether the largest network delay is greater than a network delay threshold; and
    if yes, determining that the network available bandwidth is insufficient.

7. The method according to claim 5, wherein the lowering of the coding rate and the multiplex frame quantity comprises:
    obtaining a current network type; and
    if the current network type is a local area network, adjusting the multiplex frame quantity to 1, and progressively lowering the coding rate according to a preset amplitude, until the network available bandwidth is sufficient.

8. The method according to claim 5, wherein the lowering of the coding rate and the multiplex frame quantity comprises:
obtaining a current network type; and
if the current network type is a wireless mobile network, adjusting the multiplex frame quantity to an integer less than or equal to 3, determining, according to the adjusted multiplex frame quantity, whether the network available bandwidth is sufficient, and if not, further progressively lowering the coding rate according to a preset amplitude, until the network available bandwidth is sufficient.

9. The method according to claim 1, wherein the obtaining comprehensive network status information comprises:
obtaining network status information prestored in a latest preset time; and
obtaining the comprehensive network status information by means of statistics collection according to the prestored network status information in the latest preset time.

10. The method according to claim 9, wherein the obtaining the comprehensive network status information comprises:
for each type of network status information, calculating the counted number of times of distribution of each piece of network status information, to obtain a distribution range of all statistics values, and obtaining, by means of calculation according to the range, comprehensive network status information corresponding to the type of network status information, wherein a ratio of the counted number of times of distribution of the comprehensive network status information in the range to a sum of all counted numbers of times in the entire range is a preset value, and the preset value is less than 1.

11. A mobile terminal that is communicatively connected to a plurality of mobile terminals via a computer server, the mobile terminal comprising:
one or more processors;
memory coupled to the one or more processors; and
a plurality of executable instructions stored in the memory, wherein the executable instructions, when executed by the one or more processors, cause the mobile terminal to perform the following operations:
sending voice data to at least one of the plurality of mobile terminals;
receiving at least one path of Real-Time Transport Control Protocol (RTCP) packet based on the voice data;
parsing the at least one path of the RTCP packet, to obtain network status information including network jitters;
creating comprehensive network status information based on statistics of the network status information;
adjusting a quality of service (QoS) parameter according to the comprehensive network status information by obtaining a largest one of the network jitters and adjusting a data packet group length in accordance with a determination that the largest network jitter exceeds a network jitter threshold; and
encoding and sending the voice data according to the adjusted QoS parameter.

12. The mobile terminal according to claim 11, wherein the comprehensive network status information comprises at least one of packet loss rates, and network delays.

13. The mobile terminal according to claim 12, wherein the adjusting the QoS parameter according to the comprehensive network status information comprises:
obtaining a largest one of the packet loss rates; and
calculating a redundancy packet quantity for each group according to the largest packet loss rates and the data packet group length, wherein the largest packet loss rates is less than or equal to a ratio of the redundancy packet quantity for each group to a sum of the redundancy packet quantity for each group and the data packet group length.

14. The mobile terminal according to claim 12, wherein the adjusting of the QoS parameter comprises:
obtaining a largest one of the network delays; and
determining, according to the largest network delay, whether network available bandwidth is sufficient; and
if not, lowering a coding rate and adjusting a multiplex frame quantity, wherein the multiplex frame quantity is used to control a quantity of audio frames to be used as one data packet for sending.

15. The mobile terminal according to claim 14, wherein the determining of whether the network available bandwidth is sufficient comprises:
determining whether whether the largest network delay is greater than a network delay threshold; and
if yes, determining that the network available bandwidth is insufficient.

16. The mobile terminal according to claim 14, wherein the lowering of the coding rate and the multiplex frame quantity comprises:
obtaining a current network type;
if the current network type is a local area network, adjusting the multiplex frame quantity to 1, and progressively lowering the coding rate according to a preset amplitude, until the network available bandwidth is sufficient; and
if the current network type is a wireless mobile network, adjusting the multiplex frame quantity to an integer less than or equal to 3, determining, according to the adjusted multiplex frame quantity, whether the network available bandwidth is sufficient, and if not, further progressively lowering the coding rate according to a preset amplitude, until the network available bandwidth is sufficient.

17. A non-transitory computer readable storage medium storing a plurality of executable instructions configured for execution by one or more processors of a mobile terminal that is communicatively connected to a plurality of mobile terminals via a computer server, wherein the plurality of instructions, when executed by the one or more processors, cause the mobile terminal to perform the following operations:
sending voice data to at least one of the plurality of mobile terminals;
receiving at least one path of Real-Time Transport Control Protocol (RTCP) packet based on the voice data;
parsing the at least one path of the RTCP packet, to obtain network status information including network jitters;
creating comprehensive network status information based on statistics of the network status information;
adjusting a quality of service (QoS) parameter according to the comprehensive network status information by obtaining a largest one of the network jitters and adjusting a data packet group length in accordance with a determination that the largest network jitter exceeds a network jitter threshold; and encoding and sending the voice data according to the adjusted QoS parameter.

\* \* \* \* \*